(12) United States Patent
O'Neill

(10) Patent No.: US 11,488,312 B2
(45) Date of Patent: Nov. 1, 2022

(54) SYSTEM AND METHODS FOR TRACKING LIVE PRODUCTS

(71) Applicant: Starline Global Trade, Inc., Chatsworth, CA (US)

(72) Inventor: Matthew O'Neill, Chatsworth, CA (US)

(73) Assignee: Starline Global Trade, Inc., Northridge, CA (US)

(*) Notice: Subject to any disclaimer, the term of this patent is extended or adjusted under 35 U.S.C. 154(b) by 0 days.

(21) Appl. No.: 16/376,470

(22) Filed: Apr. 5, 2019

(65) Prior Publication Data

US 2020/0320716 A1 Oct. 8, 2020

(51) Int. Cl.
*G06Q 50/02* (2012.01)
*G06Q 10/08* (2012.01)
*G06V 20/10* (2022.01)
*G06T 7/20* (2017.01)
*H04N 7/18* (2006.01)

(52) U.S. Cl.
CPC .............. *G06T 7/20* (2013.01); *G06Q 10/087* (2013.01); *G06Q 50/02* (2013.01); *G06V 20/188* (2022.01); *H04N 7/185* (2013.01); *G06T 2207/30188* (2013.01)

(58) Field of Classification Search
CPC ............ G06T 7/20; G06T 2207/30188; G06K 9/00657; G06Q 10/087; G06Q 50/02; H04N 7/185
See application file for complete search history.

(56) References Cited

U.S. PATENT DOCUMENTS

| | | | |
|---|---|---|---|
| 2006/0218057 A1* | 9/2006 | Fitzpatrick | G06Q 10/04 705/28 |
| 2018/0075406 A1* | 3/2018 | Kingston | B07C 5/342 |
| 2018/0082375 A1* | 3/2018 | Greenberg | G06K 9/00 |
| 2018/0295783 A1* | 10/2018 | Alexander | A01G 7/00 |
| 2019/0259108 A1* | 8/2019 | Bongartz | A01G 31/02 |
| 2020/0005230 A1* | 1/2020 | Brooks | G06Q 10/06315 |
| 2020/0219172 A1* | 7/2020 | Foeller | G06Q 30/0635 |

\* cited by examiner

*Primary Examiner* — Vincent Rudolph
*Assistant Examiner* — Timothy Choi
(74) *Attorney, Agent, or Firm* — Wolf, Greenfield & Sacks, P.C.

(57) ABSTRACT

A system that provides tracking during growth stages, harvesting stages, processing stages, packaging stages and shipping stages of a grown product lifecycle. Various sets of sensors are associated with grown product and/or purchaser order. Sensors enable a purchaser to access live or real time video displays of a group of product associated with the purchaser.

16 Claims, 9 Drawing Sheets

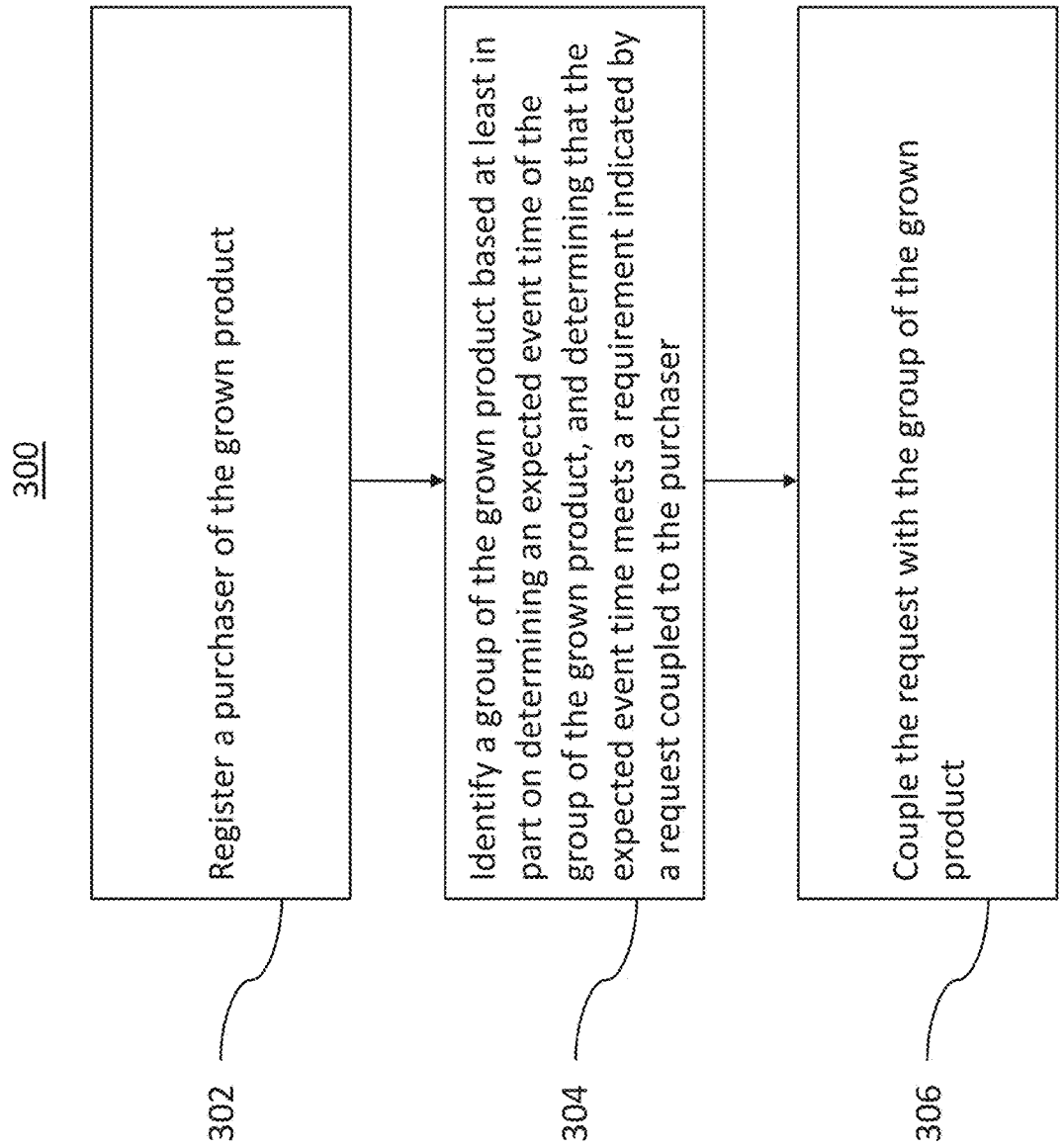

SYSTEM AND METHODS FOR TRACKING LIVE PRODUCTS

BACKGROUND OF INVENTION

Many conventional approaches claim to provide farm to table options. These conventional options provide some assurance to an end recipient that they are receiving their product from a specific source or even location.

SUMMARY OF INVENTION

The inventors have realized that there is a need for a system that provides integration of live video streams during growth stages, harvesting stages, processing stages, packaging stages and delivery stages of product lifecycle from ground to table. According to various embodiments, various sets of sensors are associated with grown product and/or a purchaser order. The sensors provide feedback to the system to enable the purchaser to access live or real time video displays of their product/order. In further embodiments, the active sensors change from the sensors used in the growth stage to different sets of sensors in a processing stage for the grown product. Additional sensors can be employed between grow sites and processing facilities to provide information and/or video feeds during transit or handoffs.

According to various embodiments, no conventional system provides purchasers the ability to track their specific order as is grown in the field, transitioned to processing, during processing, and during subsequent delivery. The stage-specialized set of sensors enables live or real time viewing, and enables to the system to automatically find and display product associated with a given purchaser. In further embodiments, visual displays are modified to highlight respective product in the display, and provide easily recognizable indications of the boundaries associated with respective orders.

According to aspects of the present disclosure, there is a system for tracking a grown product. The system comprises at least one processor, operatively connected to a memory, a registration component, executed by the at least one processor, configured to register a purchaser of the grown product, and a tracking component, executed by the at least one processor. The tracking component is configured to identify a group of the grown product based at least in part on determining an expected event time of the group of the grown product and determining that the expected event time meets a requirement indicated by a request coupled to the purchaser and couple the request with the group of the grown product.

In some embodiments, the tracking component is configured to determine the expected event time based at least on part on determining a current status of the group of the grown product.

In some embodiments, the tracking component is configured to determine the at least one requirement using information from the purchaser.

In some embodiments, the system further comprises a monitoring component, executed by the at least one processor, configured to determine a monitoring request using information from the purchaser; and provide a live video capture of the group of the grown product responsive to the monitoring request.

In some embodiments, the tracking component comprises a sensor disposed in a growing region and the expected event time of the group of the grown product comprises an expected harvest time of the group of the grown product.

In some embodiments, the sensor comprises an optical sensor configured to obtain optical sensor data of the group of the grown products when the group of the grown product is disposed in the growing region and the tracking component is configured to determine an optical characteristic of the grown product using the optical sensor data and determine the expected harvest time using the optical characteristic.

In some embodiments, the tracking component comprises a sensor disposed in a processing region and the expected event time of the group of the grown product comprises an expected processing completion time of the group of the grown product.

In some embodiments, the sensor comprises an optical sensor configured to obtain optical sensor data of the group of the grown products when the group of the grown product is disposed in the processing region and the tracking component is configured to determine an optical characteristic of the grown product using the optical sensor data and determine the expected processing completion time using the optical characteristic.

According to aspects of the present disclosure, there is a method for tracking a grown product. The method comprises registering a purchaser of the grown product, identifying a group of the grown product based at least in part on determining an expected event time of the group of the grown product, and determining that the expected event time meets a requirement indicated by a request coupled to the purchaser, and coupling the request with the group of the grown product.

In some embodiments, determining the expected event time comprises determining the expected event time based at least on part on determining a current status of the group of the grown product.

In some embodiments the method further comprises determining the at least one requirement using information from the purchaser.

In some embodiments, the method further comprises determining a monitoring request using information from the purchaser and providing a live video capture of the group of the grown product responsive to the monitoring request.

In some embodiments, the expected event time of the group of the grown product comprises an expected harvest time of the group of the grown product, and the method further comprises obtaining optical sensor data of the group of the grown product when the group of the grown product is disposed in a growing region, determining an optical characteristic of the grown product using the optical sensor data, and determining the expected harvest time using the optical characteristic.

In some embodiments, the expected event time of the group of the grown product comprises an expected processing completion time of the group of the grown product, and the method further comprises obtaining optical sensor data of the group of the grown product when the group of the grown product is disposed in a processing region, determining an optical characteristic of the grown product using the optical sensor data, and determining the expected processing completion time using the optical characteristic.

According to aspects of the present disclosure, there is at least one non-transitory computer-readable storage medium encoded with executable instructions that, when executed by at least one processor, cause the at least one processor to carry out a method. The method comprises registering a purchaser of the grown product, identifying a group of the grown product based at least in part on determining an expected event time of the group of the grown product, and determining that the expected event time meets a requirement indicated by a request coupled to the purchaser, and coupling the request with the group of the grown product.

In some embodiments, determining the expected event time comprises determining the expected event time based at least on part on determining a current status of the group of the grown product.

In some embodiments, the method further comprises determining the at least one requirement using information from the purchaser.

In some embodiments, the method further comprises determining a monitoring request using information from the purchaser and providing a live video capture of the group of the grown product responsive to the monitoring request.

In some embodiments, the expected event time of the group of the grown product comprises an expected harvest time of the group of the grown product, and the method further comprises obtaining optical sensor data of the group of the grown product when the group of the grown product is disposed in a growing region, determining an optical characteristic of the grown product using the optical sensor data, and determining the expected harvest time using the optical characteristic.

In some embodiments, the expected event time of the group of the grown product comprises an expected processing completion time of the group of the grown product, and the method further comprises obtaining optical sensor data of the group of the grown product when the group of the grown product is disposed in a processing region, determining an optical characteristic of the grown product using the optical sensor data, and determining the expected processing completion time using the optical characteristic. Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 3 is an example process flow of tracking a grown product; and

DETAILED DESCRIPTION OF INVENTION

According to some aspects of the present disclosure, there are provided systems and associated methods for tracking grown products. In some embodiments, a grown product may comprise a planted commodity. According to some aspects, the growth of a commodity (e.g., pistachios, almonds, etc.) can be tracked through various product cycle stages. The stages may include planting, growing, harvesting, processing, packaging, and delivery, and the commodity may be continuously tracked through each stage and handoffs between stages.

According to aspects of the present disclosure, there is provided real time tracking of planted commodities or other articles, for example, using real time video feeds. In some embodiments, the articles tracked by the system may comprise a planted commodity or a grown product. Various embodiments are configured to automatically adjust or focus various camera emplacements on a respective customer's order and to display the product associated with that order. In some embodiments, a tracking system may be applied to other articles. For example, the tracking system may be applied to various other articles which progress through stages of a product cycle, such as products built on an assembly line.

Figure 1:
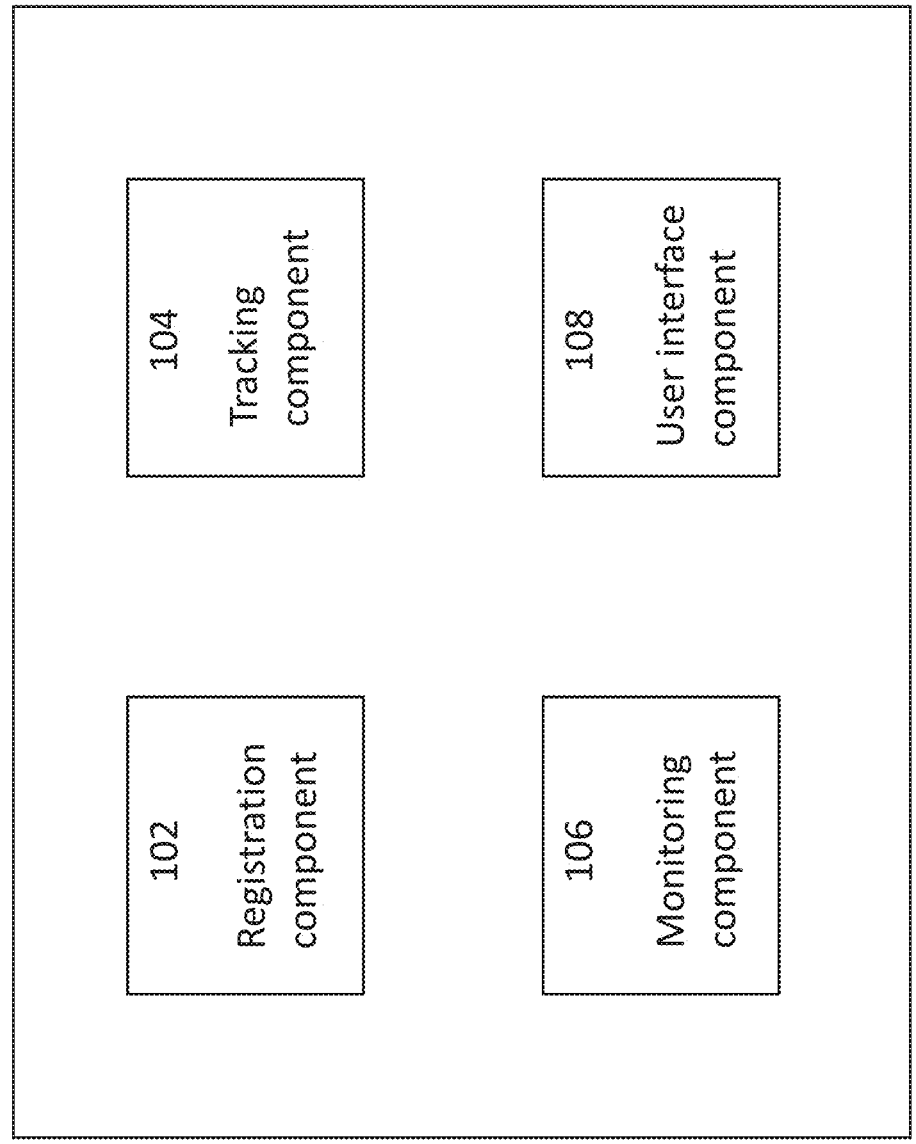
FIG. 1 is a block diagram of an example system for tracking a grown product.
Figure 2A:
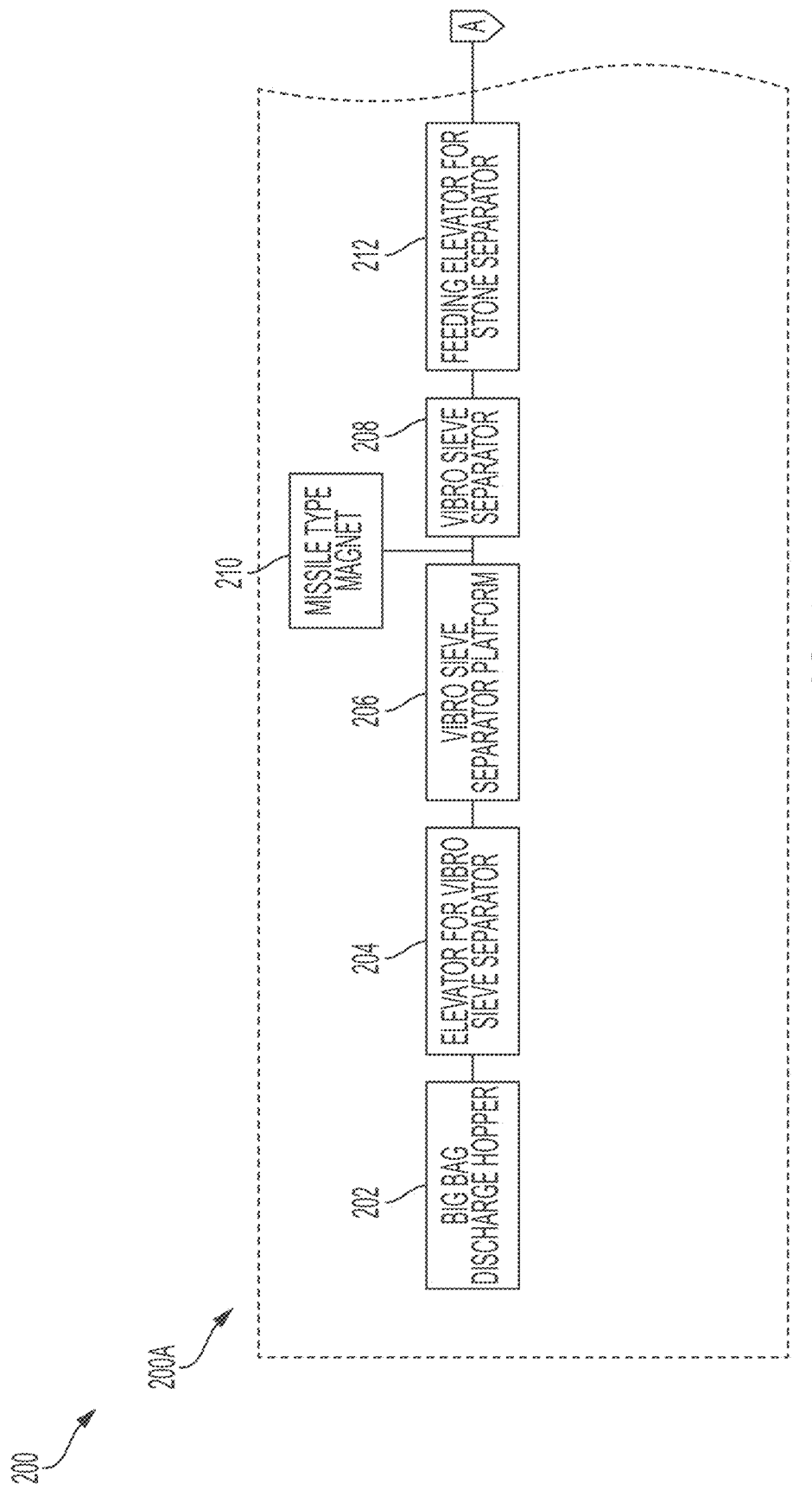
FIGS. 2A-2F are a block diagram of an example processing system for grown products.
Figure 2B:
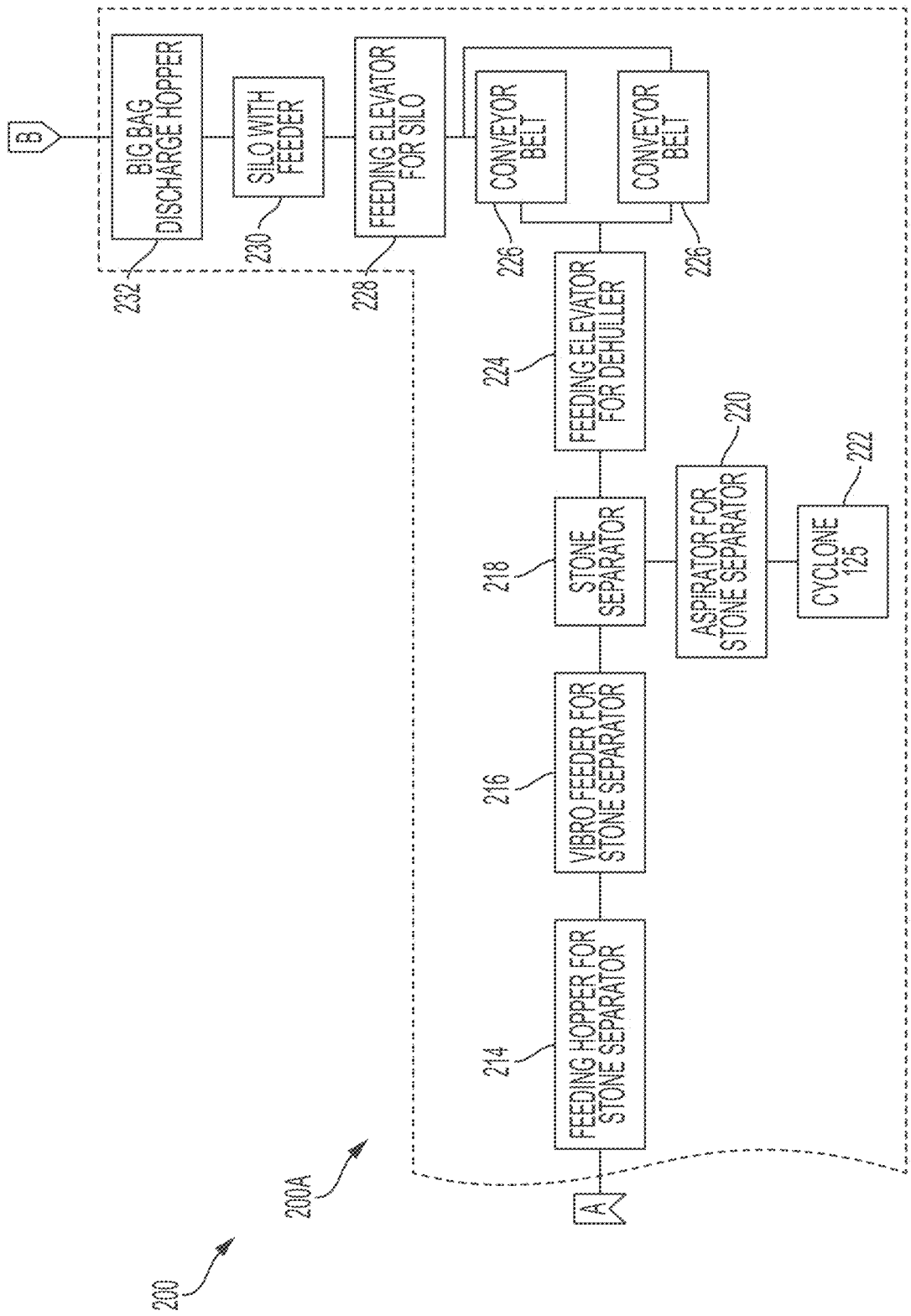
Figure 2C:
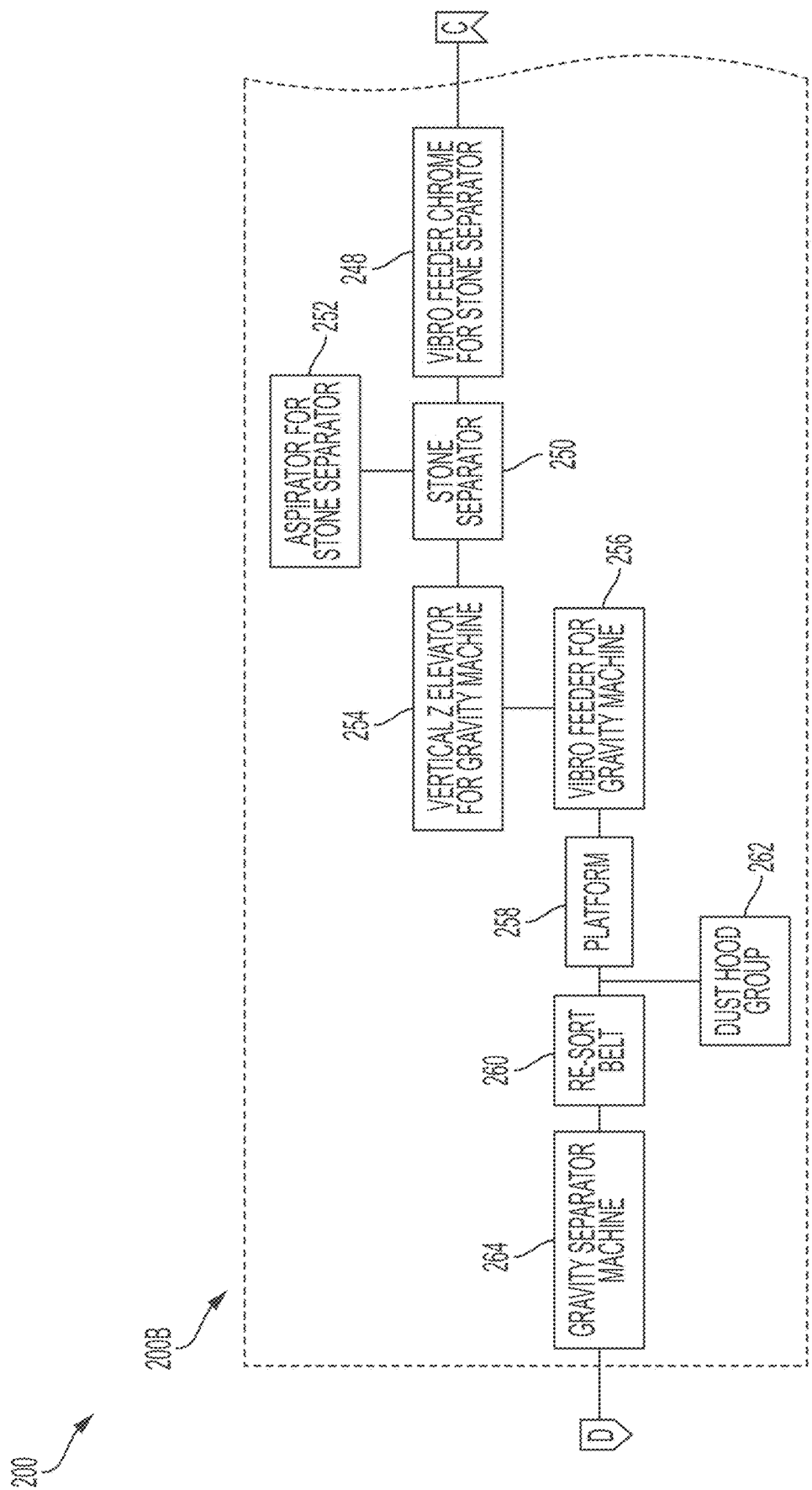
Figure 2D:
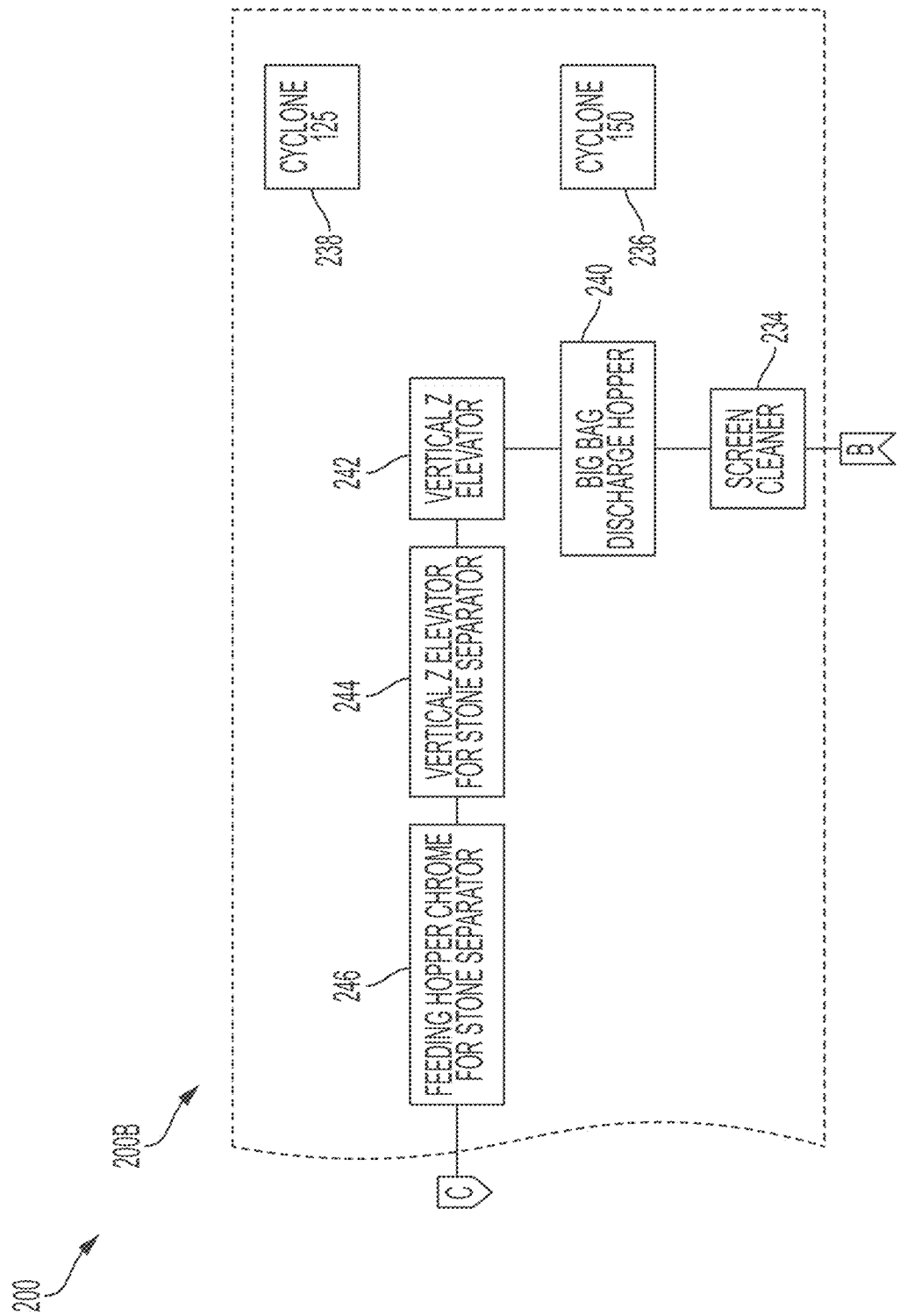
Figure 2E:
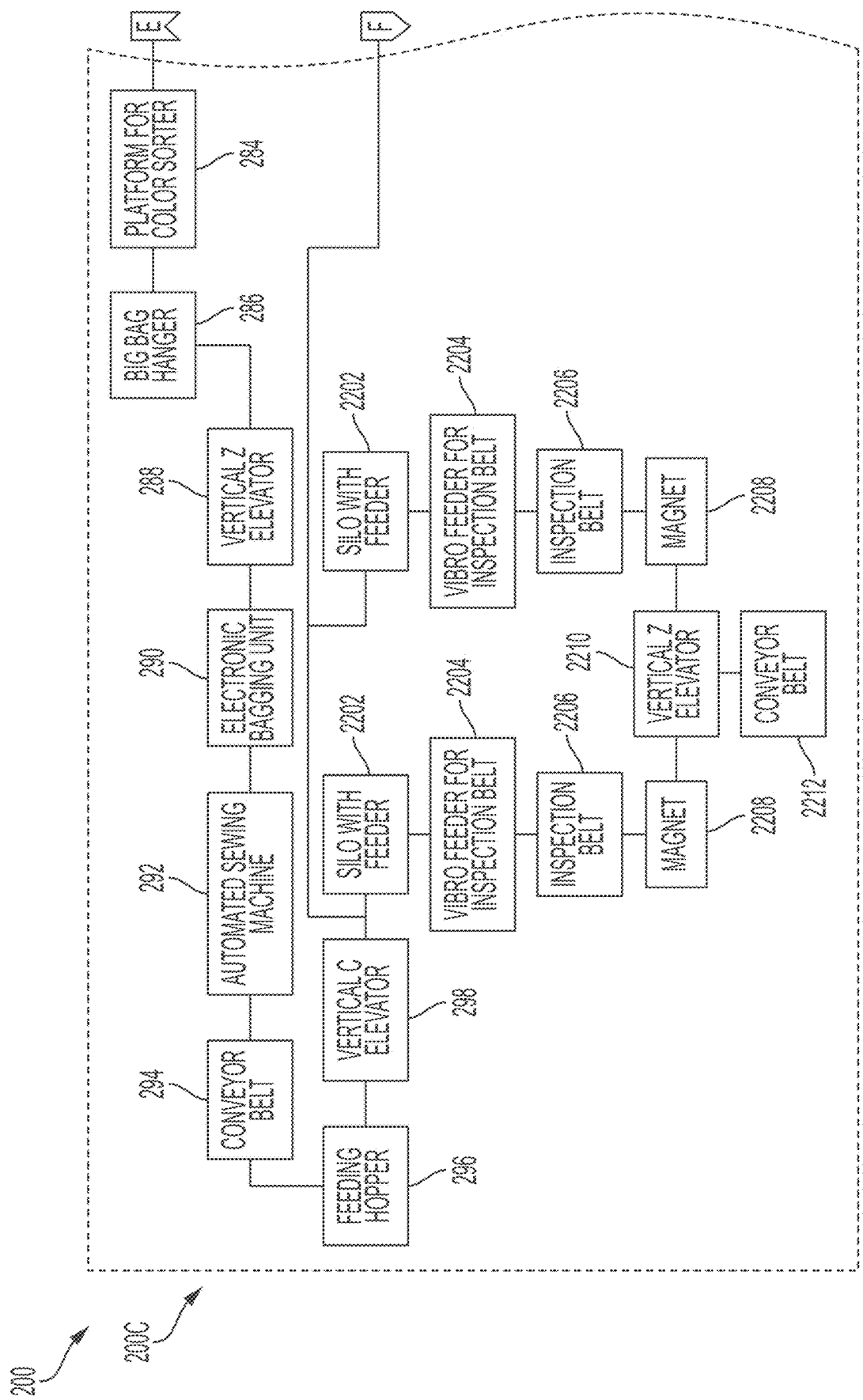
Figure 2F:
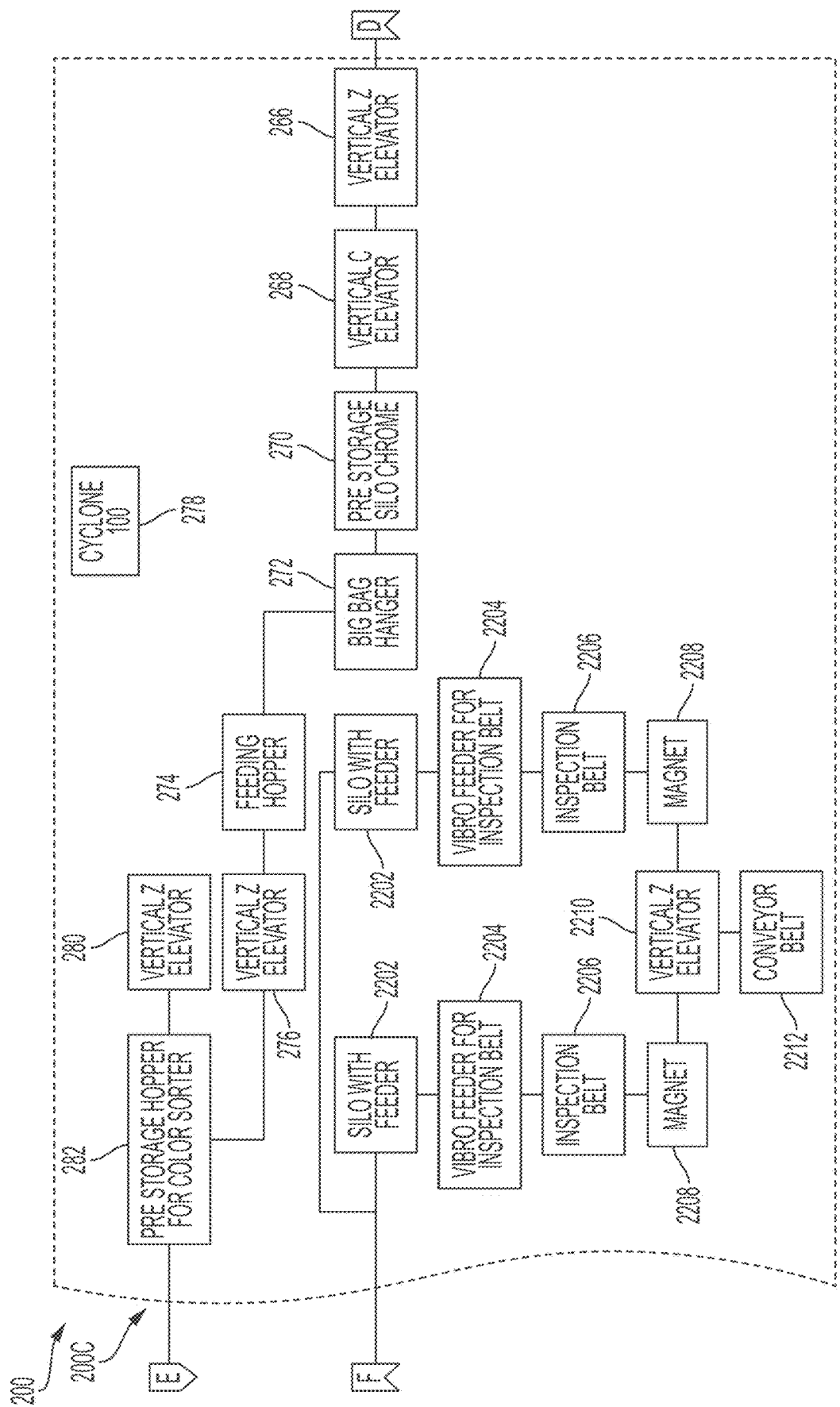

FIG. 1 shows a block diagram of an example tracking system 100. According to one embodiment, tracking system 100 can be instantiated on a computer system (e.g., as described in reference to FIG. 3 below). In the illustrative embodiment, tracking system 100 includes registration component 102, tracking component 104, monitoring component 106, and user interface component 108. According to some embodiments, registration component 102 associates purchasers to orders. According to some embodiments, tracking component 104 associates orders to sensor systems. According to some embodiments, monitoring component 106 may comprise a video controller that controls live video feed cameras. A video controller may use sensor data to adjust, position, move, and/or focus cameras. According to some embodiments, user interface component 108 may comprise a web based or app based interface. The user interface component 108 may allow a purchaser to enter orders, access video, and perform other monitoring tasks.

According to one embodiment, there are provided systems and methods for tracking pistachios. The systems and methods may be configured to track pistachios in stages of planting, harvesting, and/or processed source. In some embodiments, the tracking further comprises tracking of shipped purchaser lots, enabling a user to track and view a nut in an order from tree to plate. This functionality is unavailable in conventional systems, and is still lacking in product streams that only provide assurances that a location is in fact a source of the product being delivered.

Purchasers can access or install an application that provides remote real time tracking of the status and/or visualization of a grown product, or of other articles. In some embodiments, the real time tracking of the grown product provides real time tracking of a specific group of the grown product that is matched with the purchaser. According to some embodiments, real time video feeds of the matched product is also provided. For example, the system can be configured to access sensor data associated with a respective order, and use the sensor data to adjust, move, and/or focus cameras on the associated product. According to some embodiments, the application and associated user interface components, such as user interface component 108, enable registration of purchasers, ordering of products, association between purchases and ordered product, and tracking of product (e.g., grown food stuff) on the order of metrics tonnes. In some examples, the system provides visual indications in the real time display of boundaries of respective orders.

For example, a grown pistachios are processed, the real time video feeds showing processing are configured to display various portions of an order as associated with a respective customer, and may include highlighting of a beginning of a respective order, and highlighting of the end of a respective order, as many purchaser orders are processed.

According to aspects of the present application a system for tracking a grown product is configured to provide various functionalities for purchasers of the grown products. In some embodiments, the tracking system may provide registration, purchase, tracking, monitoring, and other functionality.

According to one aspect, a purchaser may access an application or a website via a device connected to the tracking system by a network. In some embodiments, the purchaser may download an application to a device in order to access the application.

According to some aspects, a registration component of the tracking system, such as registration component 102, may provide various functionalities. A registration component may be mounted on or executed by at least one processor of a tracking system according to the present disclosure. For example, the registration component can be configured to register new purchasers of any of the grown products tracked by the tracking system, for example to create a purchaser account. Registration may include requesting relevant identifying information from the purchaser, such as name, company, location, address, etc.

The registration component may also provide methods of placing orders for grown products. An order for grown product may indicate various order information, such as type of grown product, grown product variety, type of processing of grown product, quantity of grown product, desired delivery window of grown product, delivery location or address, order frequency/recurrence, or other tangentially related or implicit information, as well as identifying information of the purchaser described above. Received order information may be stored in at least one data store to be used by the tracking system at a later time. In some embodiments, stored order information may be used to create a purchaser profile, or a default or recommended order, which is to be presented to a purchaser making a subsequent order.

The information provided by a purchaser may directly indicate various order requirements. Alternatively or additionally, information provided by the purchaser may be used by the registration component to determine order requirements, for example, when an order requirement to be used by the tracking system is not explicit from the information provided by the purchaser.

In some embodiments, the registration component may provide an electronic or other order form which contains fields to be populated by a purchaser. In other embodiments, the registration component may determine order information from free-form text, or from audio comprising speech, which may be transcribed using speech recognition software.

According to aspects of the present application, there may be various order requirements utilized by the tracking system. For example, order requirements may make up a list of requirements which must be met to fulfill an order from a purchaser. In some embodiments, there may additionally be optional order requirements which do not need to be met to fulfill an order yet are desired to be filled. Various order requirements may be comprise type of grown product, grown product variety, type of processing of grown product, quantity of grown product, desired delivery window of grown product, delivery location or address, etc.

According to aspects of the present application, the tracking system further comprises a tracking component, such as tracking component 104. The tracking component may similarly be mounted on or executed by at least one processor of the tracking system. The tracking component can be configured to track specific lots of grown product through all aspects of a product cycle. In some embodiments, a lot of grown product is tracked through each process and associated machine/worker, from planting to delivery. For example, in some embodiments, a lot of grown product is tracked continuously through each process of planting, growth, harvest, processing, packing, and delivery.

At various stages of the product cycle, a lot of grown product may be assigned an identifier. In some embodiments, a lot of grown product is assigned an identifier during at least one of the planting, growth, harvest, processing, packing, or delivery stages. The associated identifier may be maintained through the product cycle. The identifier may allow the lot of the grown product to be coupled to an order or a purchaser.

A lot of grown product may also be tracked through a hand-off or transition between processes or processing stages. For example, tracking a lot of grown product through each hand-off can ensure that each lot of grown product is correctly identified and tracked throughout the entire product cycle. In various embodiment, the system is configured to manage a transition between a first set of sensors and a second set of sensor in a subsequent processing stage. In further example, an RFID (radio frequency identification device) can be coupled or pairs with various elements of a lot of grown product. The RFID can provide signals, and/or location information to facilitate video monitoring of growing product in a field. In another embodiment, when transitioning to an next stage, the RFID signals may be used to validate proper transition to a new set of sensors (e.g., package embedded sensors) to enable tracking (and/or video monitoring) in a transit stage. In a further example, the transit stage can have set of sensors, that are used to validate proper transition to a processing facility for processing the grown product (e.g., cracking nuts). The transition to the processing facility can include video monitoring and algorithmic estimation of the lot size (e.g., to provide live video of customer specific lots). The estimations calculations can be dynamically adjusted, for example, based on information from the prior stages sensors. In one example, a prior stage sensor can indicate empty or complete transition once all the product associated with a specific lot is transitioned to a next stage. Video monitoring may have already estimated an end of lot position in the video feed (e.g., video analysis of a monitored lot can use boundary identification for start of a lot, estimate based on video observed/analyzes movement speed the end of the customer lot, etc.), in which can the system can dynamically adjust the estimated boundary—discussed further below. In some embodiments, at least one, or all order requirements determined from a purchaser order may be used by the tracking component. For example, the tracking component may configured to identify a specific lot or group of the grown product. In some embodiments, the tracking component may identify a lot of the grown product which meets the at least one requirement. The tracking component may determine a current status of the lot of the grown product. The tracking component may further determine and an expected event time of the lot of the grown product.

In some embodiments, the tracking component determines a current status of the lot of the grown product. Using the current status of the lot of the grown product, along with historical data and/or predictive models or other methods, the tracking component may determine the expected event time. In various embodiments, and in various stages of a grown product cycle, an event time may indicate a predicted time at which various events of the stage are expected to occur. For example, the expected event time may comprise an expected planting time, an expected growth maturity time, an expected harvest time, an expected processing completion time, an expected packing completion time, or an expected delivery time.

In some embodiments, the tracking component makes a determination whether or not the expected event time meets at least one requirement indicated by a purchaser that has been communicated to the tracking component. As described above, a requirement may be indicated by a request coupled to a purchaser. If a determination is made that the expected event time does meet the requirement, the lot of the grown product may be coupled to the request. The lot of the grown product may therefore also be coupled with the purchaser and/or a specific order of the purchaser. If no lot of grown product meets a requirement, for example, if no lot meets a desired delivery window, a lot of grown product which falls most closely to an order requirement may be coupled to the purchaser or order.

In some embodiments, a lot size does not meet a requirement for quantity of grown product. In such an embodiment, the tracking component may couple more than one lots to an order. In some embodiments, a lot may be portioned into sub-lots. In some embodiments, a sub-lot may be determined by location, and a lot is partitioned by planting location or conveyor coordinate.

A lot of the grown product may be coupled to a request via the above process at various stages of the product cycle. In some embodiments, the coupling of a lot of grown product to a request is performed in one of the planting, growth, harvest, processing, or packing processes if it is determined that a lot in one of these stages meets at least one, or all requirements of an order.

For example, any of the exemplary listed expected event times may indicate if a specific lot of the grown product may meet requirements from a purchaser order, such as delivery date. A lot which is expected to be delivered by a required delivery date, may be assigned to the purchaser order coupled to that delivery date. A lot may be expected to be ready by a delivery date based on any of the expected event times, such as growth maturity time, harvest time, processing completion time, or any other expected event time.

In various stages of a product cycle, current statuses and expected event times may be determined. In a planting stage of a product cycle, a current state may relate to if a grown product has been planted. An expected event time may be a time of planting. A time of planting may be determined the tracking system. For example, a data store or other element may indicate a time at which a machine or worker is expected to or has been instructed to plant a grown product. Alternatively or additionally, a sensor is set located in at least one of a storage facility of a product-to-be-planted or a field or other facility in which planting is to be done, and may monitor their respective locations to determine if planting has yet occurred, and if so, determine the time at which planting has occurred. The related sensor data may be stored by the tracking component in at least one data store The planting sensor set may comprise various sensors, such as optical sensors. An optical sensor, such as a camera, may provide optical sensor data which may be analyzed by the tracking system to determine that a product-to-be-planted has been removed from a storage facility or that a product has been planted in a field in which planting is to be done. The optical sensor data may provide optical characteristics. In some embodiments, the optical characteristics may also indicate if a machine or worker has been in the growing region, which may also indicate that planting has occurred. Other optical analysis can be executed by the system, for example, capture video can be processed to determine if and when planting has occurred, and to determine if plants in a lot are growing as projected/expected. In some embodiments, each lot of grown product is assigned an identifier in the planting stage.

There may be a hand-off between a sensor set associated with a first stage and a sensor set associated with a following stage, for example, a handoff between the planting stage and the growth stage. In some embodiments, sensors of each of the two sets which are proximate the hand-off may track the product through the hand-off to maintain a linkage between a lot of grown product and its associated identifier. In some embodiments, a sensor set is associated only with the hand-off as a dedicated hand-off sensor set. Dedicated hand-off sensors may located at a hand-off location, or may be mounted to machinery or workers performing the hand-offs. Optical sensors in these areas can track lots through the handoffs.

In a growth stage of a product cycle, a current state may relate to a growth stage of a grown product which has been planted. An expected event time may be a time of growth maturity. A time of growth maturity may be determined by the tracking system. For example, a data store or other element may indicate an approximate time at which a grown product is expected to be mature based on historical data or other models. Time of growth maturity may be based on grown product variety, lot size, weather, climate or other factors. Alternatively or additionally, a sensor set is located in a field or other facility in which grown products have been planted, and may monitor the location to determine a growth progress of a grown product. The related sensor data may be stored by the tracking component in at least one data store A growing sensor set may comprise various sensors, such as optical sensors. An optical sensor, such as a camera, may provide optical sensor data which may be analyzed by the tracking system to determine at least one optical characteristic of a grown product. For example, a sensor disposed in a growing region may obtain optical sensor data of one or more lots of the grown products when the group of the grown product is disposed in the growing region, and the tracking component is configured to determine an optical characteristic of the grown product using the optical sensor data. In some embodiments, the optical characteristics comprise one or more visual characteristics, such as size, shape, color, grouping, and placement density. The visual characteristic of a lot may provide an indication of growth progress, which may in turn indicated growth maturity, and that a grown product is ready to be harvested. In some embodiments, each lot of grown product is assigned an identifier in the growth stage. If identifiers have previously been assigned to lots of grown product, they may be maintained in the growth stage.

In a harvest stage of a product cycle, a current state may relate to a time at which a grown product is ready to harvest or a time at which harvesting is completed. A time at which a product is ready to harvest may be determined similarly to a determination that a grown product has reached growth maturity. A time that harvesting is completed may also be determined by the tracking system. For example, a data store or other element may indicate an approximate time that harvesting is expected to be completed based on a combination of an actual or expected growth maturity time in combination with historical data or other models which indicate length of a harvesting period. Length of a harvesting period may be based on grown product variety, lot size, weather, climate or other factors. Alternatively or additionally, a sensor set is located in a field or other facility in which grown products have been planted, and may monitor the location to determine if a grown product has been harvested or when it is expected to be harvested. The related sensor data may be stored by the tracking component in at least one data store A harvesting sensor set may comprise various sensors, such as optical sensors. In some embodiments, a harvesting sensor set may comprise a same sensor set as a growth sensor set used during a growth stage. An optical sensor, such as a camera, may provide optical sensor data which may be analyzed by the tracking system to determine at least one optical characteristic of a grown product. For example, a sensor disposed in a growing region may obtain optical sensor data of one or more lots of the grown products when the group of the grown product is disposed in the growing region, and the tracking component is configured to determine an optical characteristic of the grown product using the optical sensor data. In some embodiments, the optical characteristics may indicate if the grown product is still in the growing region. The optical characteristics may also indicate if a machine or worker has been in the growing region, which may also indicate that harvesting has occurred. In some embodiments, each lot of grown product is assigned an identifier in the harvest stage. If identifiers have previously been assigned to lots of grown product, they may be maintained in the harvest stage.

In various processing stages of a product cycle, a current state may relate to a time at which processing is expected to be completed. A time at which a processing is completed may be determined by the tracking system. For example, a data store or other element may indicate an approximate time that processing is expected to take using historical data or other models which indicate length of a processing period. Length of a processioning period may be based on grown product variety, and processing type, lot or order size, type of machinery or if human workers are used, or other factors. Alternatively or additionally, a sensor set located in a processing facility and monitors the processing of a grown product to determine if processing is complete or when processing is expected to be completed. The related sensor data may be stored by the tracking component in at least one data store A processing sensor set may comprise various sensors, such as optical sensors. An optical sensor, such as a camera, may provide optical sensor data which may be analyzed by the tracking system to determine at least one optical characteristic of a grown product. For example, a sensor disposed in a processing region may obtain optical sensor data of one or more lots of the grown products when the group of the grown product is disposed in the processing region, and the tracking component is configured to determine an optical characteristic of the grown product using the optical sensor data. In some embodiments, the optical characteristics may indicate if the grown product is fully processed to an end product. In some embodiments, an optical sensor may determine that a lot of product is fully processed based on a determined location, for example, if the grown product is determined to be in a location on a processing chain after a final machine or worker station. The sensors may determine the expected completion time of processing or may also determine if the grown product is at in intermediate processing stage. In some embodiments, each lot of grown product is assigned an identifier in the processing stage. If identifiers have previously been assigned to lots of grown product, they may be maintained in the processing stage.

In various embodiments, processing equipment may comprise elements including at least one of hoppers, elevators, vibro sieve separators, stone separators, feeders, vibro feeders, dehullers, conveyor belts, screen cleaners, gravity separator machines, sort belts, color sorters, electronic bagging units, automated sewing machines, or inspection belts (which may be occupied by one or more workers). In some embodiments, some of the aforementioned processing elements may be arranged in a packing stage instead. Each processing element may be arranged consecutively, with grown product passing from each element to the next.

FIGS. 2A-2F show a processing system 200 according to some embodiments. According to some embodiments, processing system 200 may be arranged as a plurality of subsystems. For example, FIGS. 2A-2F depict a processing system 200 including a first processing subsystem 200a, a second processing subsystem 200b, and a packaging subsystem 200c. In the illustrated embodiment, grown products may be introduced to the processing system 200 at the first processing subsystem 200a. The first processing subsystem 200a performs a first processing stage on the grown product, and may include one or more sensors described herein. The first processing subsystem 200a may then transfer the grown product to the second processing subsystem 200b. The second processing subsystem 200b performs a second processing stage on the grown product, and may include one or more sensors described herein. The second processing subsystem 200b may then transfer the grown product to the packaging subsystem 200c. The packaging subsystem 200c packages the grown product, and may include one or more sensors described herein. The first processing subsystem 200a may subsequently transfer the grown product to at least one of a storage system or a delivery system.

In the illustrative embodiment, the first processing subsystem 200a includes a big bag discharge hopper 202, an elevator for vibro sieve separator 204, a vibro sieve separator platform 206, a vibro sieve separator 208, a missile type magnet 210, a feeding elevator for stone separator 212, a feeding hopper for stone separator 214, a vibro feeder for stone separator 216, a stone separator 218, an asiprator for stone separator 220, a feeding elevator for dehuller 224, one or more conveyor belts 226, a feeding elevator for silo 228, a silo with feeder 230, and a big bag discharge hopper 232. The components of the first processing subsystem 200a may be arranged at least partially sequentially as listed and/or as depicted in FIGS. 2A-2F.

In the illustrative embodiment, the second processing subsystem 200b includes a screen cleaner 234, big bag discharge hopper 240, a vertical z elevator 242, a vertical z elevator for stone separator 244, a feeding hopper chrome for stone separator 246, a vibro feeder chrome for stone separator 248, a stone separator 250, an asiprator for stone separator 252, a vertical z elevator for gravity machine 254, a vibro feeder for gravity machine 256, a platform 258, a re-sort belt 260, a dust hood group 262, and a gravity separator machine 264. The components of the second processing subsystem 200b may be arranged at least partially sequentially as listed and/or as depicted in FIGS. 2A-2F.

In the illustrative embodiment, the packaging subsystem 200c includes a vertical z elevator 266, a vertical c elevator 268, a pre storage silo chrome 270, a big bag hanger 272, a feeding hopper 274, a vertical z elevator 276, a vertical z elevator 280, a pre storage hopper for color sorter 282, a platform for color sorter 284, a big bag hanger 286, a vertical z elevator 288, an electronic bagging unit 290, an automated sewing machine 292, a conveyor belt 294, a feeding hopper 296, a vertical c elevator 298, one or more silos with feeders 2202, one or more vibro feeders for inspection belts 2204, one or more inspection belts 2206, one or more magnets 2208, one or more vertical z elevators 2210, and one or more conveyor belts 2212. The components of the first processing subsystem 200c may be arranged at least partially sequentially as listed and/or as depicted in FIGS. 2A-2F.

According to some embodiments, a processing system may further comprise one or more cyclones. For example, in the illustrative embodiment of FIGS. 2A-2F, the processing system 200 includes a "cyclone 125" 222, a "cyclone 150" 236, a "cyclone 125" 238, and a "cyclone 100" 278. Each cyclone may be coupled to a subsystem, or an element thereof, in a processing system. For example, in the illustrative embodiment, "cyclone 125" 222 is coupled to the first processing subsystem 200a, "cyclone 150" 236 is coupled to the second processing subsystem 200b, "cyclone 125" 238 is coupled to the second processing subsystem 200b, and "cyclone 100" 278 is coupled to the packaging subsystem.

According to some embodiments, the processing system 200 may include one or more sensors or sets of sensors described herein. Sensors incorporated into the processing system 200 may include visual sensors. Visual sensors may be arranged in sets, for example, one set of visual sensors for a subsystem, or one set of sensors for a component of a subsystem. In some embodiments, there is one or more visual sensor coupled to a component of the subsystem. A group of one or more sensors may be coupled to any number of the of the components of FIGS. 2A-2F described above. One or more visual sensor coupled to the component may be arranged to provide various optical views of the component, for example, a view showing grown product before entering a component, a view showing grown product entering a component, a view showing grown product within a component, a view showing grown product being exposed to the processing function of the component, a view showing grown product exiting a component, and/or a view showing grown product after exiting a component. The one or more optical sensor may capture an optical image of grown product from at least one of the various views. The image of the grown product may be analyzed to determine a characteristic of the grown product. For example, in one embodiment a first image of grown product is compared to a previous image that is known to depict a specific lot of grown product. If the comparison determines that the grown product in the first image matches the specific lot of grown product, the processing system 200 may make a determination that the grown product in the first image is of the same specific lot. The processing system may additionally or alternatively use an expected processing time of a lot of a certain size to determine that grown product is of a specific lot. Accordingly, specific lots of grown product may be identified and tracked through the processing system 200a. Alternatively or additionally, an image may be analyzed and compared to an expected condition of grown product to determine if a component is functioning properly.

Each processing element may be coupled to one or more sensors, such as cameras, weight sensors, or RFID sensors, as described above. Each sensor may be positioned so as to gather sensor data of each lot of grown products entering, within, and/or exiting a processing element. In some embodiments, a sensor is associated with an intermediate area between two processing elements such that it may monitor grown products transferring between elements. In some embodiments, the tracking system may couple a lot of grown product may be a current processing element based on sensor data which indicates the grown product is in proximity to that processing element. The current processing element may be updated as the lot of grown product progresses through the processing stage. Further, using a stored order/path of processing elements, the tracking system may determine expected completion time of processing for a lot of the grown product based on the current processing element that is coupled to the lot of grown product.

Similarly, in various packing stages of a product cycle, a current state may relate to a time at which packing is expected to be completed. A time at which a packing is completed may be determined by the tracking system. For example, a data store or other element may indicate an approximate time that packing is expected to take using historical data or other models which indicate length of a packing period. Length of a packing period may be based on grown product variety, and processing type, lot or order size, packaging type, type of machinery or if human workers are used, or other factors. Alternatively or additionally, a sensor set is located in a packing facility, and monitors the location to determine if packing is complete or when packing is expected to be completed. The related sensor data may be stored by the tracking component in at least one data store A packing sensor set may comprise various sensors, such as optical sensors. An optical sensor may provide optical sensor data which may be analyzed by the tracking system to determine at least one optical characteristic of a grown product. For example, a sensor disposed in a packing region may obtain optical sensor data of one or more lots of the grown products when the group of the grown product is disposed in the packing region, and the tracking component is configured to determine an optical characteristic of the grown product or packing of the grown product using the optical sensor data. In some embodiments, the optical characteristics may indicate if the grown product is fully packed to a deliverable product. In some embodiments, an optical sensor may determine that a lot of product is fully packed based on a determined location, for example, if the grown product is determined to be in a location on a packing chain after a final machine or worker station. The sensors may determine the expected completion time of packing or may also determine if the grown product is at in intermediate packing stage. In some embodiments, each lot of grown product is assigned an identifier in the packing stage. If identifiers have previously been assigned to lots of grown product, they may be maintained in the packing stage.

In some embodiments, some processing elements may be arranged in the packing stage as packing elements. Similar to the processing stage, the tracking system may couple a lot of grown product may be a current packing element based on sensor data which indicates the grown product is in proximity to that packing element, updating the packing element, and determining expected event times as in the processing stage.

During a delivery stage of a product cycle, a delivery may be tracked. For example, location sensors may be disposed in a delivery vehicle may be used to determine location and expected delivery time. Additionally, predetermined route information and operator check-ins may be used to determine location and expected delivery times. Optical sensors may also be disposed in a delivery vehicle for a live video feed as described below. In some embodiments, each lot of grown product is assigned in the delivery stage. If identifiers have previously been assigned to lots of grown product, they may be maintained in the delivery stage.

A tracking system according to the present disclosure may include a monitoring component, such as monitoring component 106. The monitoring component may be mounted on or executed by the at least one processor. In some embodiments, the monitoring component is configured to determine a monitoring request for a purchaser. The request may be received as information indicating an explicit request for live monitoring by the purchaser or may be determined implicitly from other information provided by the purchaser, e.g., order searching or order placement. Responsive to the request, the tracking system may provide live tracking of a specific lot of the grown product. In some embodiments, the specific lot meets at least one or all of requirements provided by a previously determined order, i.e., the purchaser has returned to the tracking system to monitor an order. In some embodiment, the lot is related to an immediately previously determined order for the purchaser, i.e., just after an order is placed. In some embodiments, the lot is related to a prospective order, i.e., the lot is shown to a purchaser deciding whether to place an order. In this case, the lot may meet a requirement from the purchaser, or if no such requirement yet exists, a default or quasi-random lot may be chosen.

In some embodiments, the live monitoring may comprise a live video capture of the group of the grown product responsive to the monitoring request. Responsive to the request, the monitoring component may determine a current location or element that has previously been coupled to the lot of grown product by the tracking component. Accordingly, if it is determined that the lot is proximate a particular location or processing/packing element, live monitoring may show a live video feed from a sensor associated with that location or element. In some embodiments, the tracking system may provide additional visual elements on a live video feed. For example, lot information may be displayed, such as an expected event time, or lot partitions. A lot partition may include a part of a Graphical User Interface (GUI), which may be included in a user interface component such as user interface component 108, drawn over the live video feed to indicate where lots are separated from one another, which may be done through each of the product cycle stages, or for elements within stages. A visual area of a lot captured by an optical sensor may be identified by characteristics and linked to an order. As part of the linkages, order size may be used to determine a lot size of the grown product, which may be linked to a acreage of field, or processed product weight or volume.

In some embodiments, estimation techniques are used to estimate spoilage or failure of some crops to grow so that lot size may be accurately estimated from a field acreage. The tracking system may also provide flexibility to change re-assign lots to meet earlier demand or later demand, or change in order. Additionally, the system may allow lots to be reassigned if lots fail due to spoilage, destruction, or other factors. If lot characteristics are known for each lot, then lots may easily be reassigned to best satisfy order requirements. For example, if products grow faster than expected, they may be reassigned to earlier orders. Since products must be planted months in advance, monitoring at all times allows complete or almost complete information when unanticipated events occur, allowing the rebalancing of orders to refine variety inherent in live growth crops.

Live monitoring such as live video monitoring may provide several advantages. Live monitoring may be attractive to potential customers and may provide a sense of freshness if the product can be seen at most or all times continuously through the product cycle. Live monitoring may also provide more accurate expected delivery times for a customer.

Additional sensors which may be included in each of the product cycle stages may include force sensors to provide weight measurements, which may be in turn used with known densities of product varieties to determine volume, electroacoustic transducers which may provide acoustic signals to excite a grown product and/or measure acoustic signals from the grown products, chemical sensors to determine growth stage based on soil, air, or other chemical compositions near grown products, weather or thermal sensors to determine weather or climate cycles near grown products, fluid sensors to determine amounts of liquids provided to the grown product, location sensors which may be used to determine weather or climate.

It should be appreciated that a tracking system according to the foregoing may provide a desirable method for tracking a grown product, such as process 300 shown by FIG. 3. Process 300 comprises a step 302 of registering a purchaser of the grown product.

Process 300 comprises a step 304 of identifying a group of the grown product based at least in part on determining an expected event time of the group of the grown product, and determining that the expected event time meets a requirement indicated by a request coupled to the purchaser. Process 300 comprises a step 306 of coupling the request with the group of the grown product.

Aspects of the present application may provide at least one non-transitory computer-readable storage medium encoded with executable instructions that, when executed by at least one processor, cause the at least one processor to carry out a method, such as process 300 described above.

A few non-limiting exemplary planted commodities include dried fruits and nuts such as pistachios, almonds, and walnuts. In various embodiments, the planted commodities may include various shipped products. Processing types for pistachios may comprise shelled varieties, which may include whole kernel, pistachio meal, small pieces, halves and pieces, and splits, and inshell varieties, which may include raw and salted. Processing types for almonds may comprise blanched varieties which may include meal, slivers, while, sliced, and dices, and manufactured varieties which may include slices, dices, and meal. Processing types for walnuts may comprise shelled varieties, which may include light halves, light halves and pieces, light small pieces, combination halves and pieces, and combination medium pieces, an inshell varieties. Varieties of grown products may each be associated with various optical or other characteristics which may be used by a tracking component to determine if an order-related requirement is met. Varieties of grown products may be associated with historical growth and harvesting data as described above, which may be known to be dependent on weather and climate, among other factors.

Figure 4:
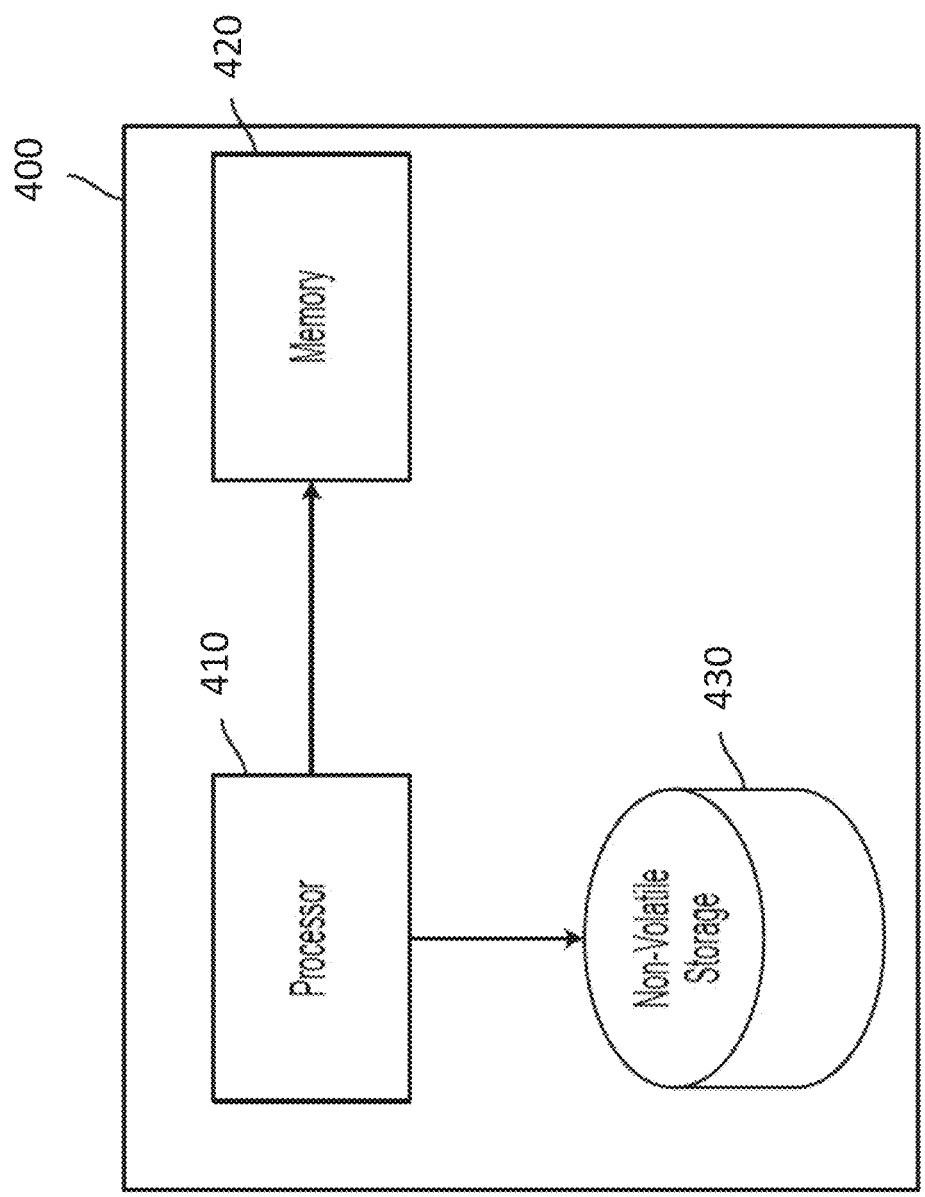
FIG. 4 is a block diagram of a computer system on which various functions can be implemented

Additionally, an illustrative implementation of a computer system 400 that may be used in connection with any of the embodiments of the disclosure provided herein is shown in FIG. 4. The computer system 400 may include one or more processors 410 and one or more articles of manufacture that comprise non-transitory computer-readable storage media (e.g., memory 420 and one or more non-volatile storage media 430). The processor 410 may control writing data to and reading data from the memory 420 and the non-volatile storage device 430 in any suitable manner. To perform any of the functionality described herein, the processor 410 may execute one or more processor-executable instructions stored in one or more non-transitory computer-readable storage media (e.g., the memory 420), which may serve as non-transitory computer-readable storage media storing processor-executable instructions for execution by the processor 410.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to FIG. 3) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for tracking a grown product, the system comprising:

a tracking component, executed by the at least one processor, configured to:
  identify a group of the grown product based at least in part on determining a first expected event time of the group of the grown product and determining that the first expected event time meets a requirement indicated by a request coupled to the purchaser;
  generate a linkage between the group of the grown product and an identifier;
  couple the request with the group of the grown product using the identifier;
  track the group of the grown product through a hand-off between a growing region and a processing region; and
  maintain the linkage between the group of the grown product and the identifier through the hand-off between the growing region and the processing region, wherein:
the tracking component comprises a first sensor disposed in the processing region, the processing region including at least one piece of machinery configured to process harvested grown product;
the first expected event time of the group of the grown product comprises an expected processing completion time of the group of the grown product;
the first sensor comprises a first optical sensor configured to obtain first optical sensor data of the group of the grown product when the group of the grown product is disposed in the processing region after a harvest time of the group of the grown product; and
the tracking component is configured to determine an optical characteristic of the grown product using the first optical sensor data and determine the expected processing completion time using the optical characteristic,
the system further comprising a monitoring component, executed by the at least one processor, configured to:
  determine a monitoring request using information from the purchaser; and
  responsive to the monitoring request, provide a live video capture highlighting the group of the grown product from a plurality of groups of the grown product,
  wherein providing the live video capture highlighting the group of the grown product from the plurality of groups of the grown product comprises:
  drawing, in a graphical user interface (GUI), over the live video capture, an indication of where the group of the grown product is separated from other groups of the grown product.

2. The system of claim 1, the tracking component is configured to determine the first expected event time based at least on part on determining a current status of the group of the grown product.

3. The system of claim 1, wherein the tracking component is configured to determine the at least one requirement using information from the purchaser.

4. The system of claim 1, wherein:
the tracking component is further configured to identify the group of the grown product based at least in part on determining a second expected event time of the group of the grown product and determining that the second expected event time meets the requirement indicated by the request coupled to the purchaser;
the tracking component comprises a second sensor disposed in the growing region; and
the second expected event time of the group of the grown product comprises an expected harvest time of the group of the grown product.

5. The system of claim 4, wherein:
the second sensor comprises a second optical sensor configured to obtain second optical sensor data of the group of the grown product when the group of the grown product is disposed in the growing region; and
the tracking component is configured to determine an optical characteristic of the grown product using the second optical sensor data and determine the expected harvest time using the optical characteristic.

6. The system of claim 1, wherein the monitoring component is further configured to:
receive the monitoring request from the purchaser; and
responsive to receiving the monitoring request from the purchaser, provide, to the purchaser, the live video capture highlighting the group of the grown product from the plurality of groups of the grown product.

7. The system of claim 1, wherein drawing, in the GUI, over the live video capture, the indication comprises:
highlighting a beginning of the group of the grown product in the GUI; and
highlighting an end of the group of the grown product in the GUI.

8. The system of claim 1, wherein providing the live video capture highlighting the group of the grown product from the plurality of groups of the grown product comprises:
determining a current location of the group of the grown product; and
obtaining the live video capture from an optical sensor configured to monitor the current location.

9. A method for tracking a grown product, the method comprising:
registering a purchaser of the grown product;
identifying a group of the grown product based at least in part on determining a first expected event time of the group of the grown product, and determining that the first expected event time meets a requirement indicated by a request coupled to the purchaser, wherein the first expected event time of the group of the grown product comprises an expected processing completion time of the group of the grown product;
generating a linkage between the group of the grown product and an identifier;
coupling the request with the group of the grown product using the identifier;
tracking the group of the grown product through a hand-off between a growing region and a processing region;
maintaining the linkage between the group of the grown product and the identifier through the hand-off between the growing region and the processing region;
obtaining first optical sensor data of the group of the grown product when the group of the grown product is disposed in the processing region after a harvest time of the group of the grown product, the processing region including at least one piece of machinery configured to process harvested grown product;
determining an optical characteristic of the grown product using the first optical sensor data;
determining the expected processing completion time using the optical characteristics;
determining a monitoring request using information from the purchaser; and responsive to the monitoring request, providing a live video capture highlighting the group of the grown product from a plurality of groups of the grown product, wherein providing the live video capture highlighting the group of the grown product from the plurality of groups of the grown product comprises:

drawing, in a graphical user interface (GUI), over the live video capture, an indication of where the group of the grown product is separated from other groups of the grown product.

10. The method of claim 9, wherein determining the first expected event time comprises determining the first expected event time based at least on part on determining a current status of the group of the grown product.

11. The method of claim 9, further comprising determining the at least one requirement using information from the purchaser.

12. The method of claim 9, wherein a second expected event time of the group of the grown product comprises an expected harvest time of the group of the grown product, and wherein the method further comprises:

identifying the group of the grown product based at least in part on determining the second expected event time of the group of the grown product and determining that the second expected event time meets the requirement indicated by the request coupled to the purchaser obtaining second optical sensor data of the group of the grown product when the group of the grown product is disposed in the growing region;

determining an optical characteristic of the grown product using the second optical sensor data; and determining the expected harvest time using the optical characteristic.

13. At least one non-transitory computer-readable storage medium encoded with executable instructions that, when executed by at least one processor, cause the at least one processor to carry out a method comprising:

registering a purchaser of the grown product;

identifying a group of the grown product based at least in part on determining a first expected event time of the group of the grown product, and determining that the first expected event time meets a requirement indicated by a request coupled to the purchaser, wherein the first expected event time of the group of the grown product comprises an expected processing completion time of the group of the grown product;

generating a linkage between the group of the grown product and an identifier;

coupling the request with the group of the grown product using the identifier;

tracking the group of the grown product through a hand-off between a growing region and a processing region;

maintaining the linkage between the group of the grown product and the identifier through the hand-off between the growing region and the processing region;

obtaining first optical sensor data of the group of the grown product when the group of the grown product is disposed in the processing region after a harvest time of the group of the grown product, the processing region including at least one piece of machinery configured to process harvested grown product;

determining an optical characteristic of the grown product using the first optical sensor data;

determining the expected processing completion time using the optical characteristic;

determining a monitoring request using information from the purchaser; and responsive to the monitoring request, providing a live video capture highlighting the group of the grown product from a plurality of groups of the grown product, wherein providing the live video capture highlighting the group of the grown product from the plurality of groups of the grown product comprises:

drawing, in a graphical user interface (GUI), over the live video capture, an indication of where the group of the grown product is separated from other groups of the grown product.

14. The at least one non-transitory computer-readable storage medium of claim 13, wherein determining the first expected event time comprises determining the first expected event time based at least on part on determining a current status of the group of the grown product.

15. The at least one non-transitory computer-readable storage medium of claim 13, wherein the method further comprises determining the at least one requirement using information from the purchaser.

16. The at least one non-transitory computer-readable storage medium of claim 13, wherein a second expected event time of the group of the grown product comprises an expected harvest time of the group of the grown product, and wherein the method further comprises:

identifying the group of the grown product based at least in part on determining the second expected event time of the group of the grown product and determining that the second expected event time meets the requirement indicated by the request coupled to the purchaser obtaining second optical sensor data of the group of the grown product when the group of the grown product is disposed in the growing region;

determining an optical characteristic of the grown product using the second optical sensor data; and determining the expected harvest time using the optical characteristic.

* * * * *